United States Patent Office 2,759,036
Patented Aug. 14, 1956

2,759,036

STORAGE BATTERY ACTIVE MATERIAL

Reginald H. Greenburg, Brooklyn, N. Y., and Joseph A. Orsino, Mountain Lakes, N. J., assignors to National Lead Company, New York, N. Y., a corporation of New Jersey No Drawing. Application May 19, 1954, Serial No. 431,012

11 Claims. (Cl. 136—26)

This invention relates to storage battery active materials and more particularly to an active material adapted to the manufacture of dry charged lead-acid storage batteries.

Lead-acid storage batteries consist of positive and negative plates insulated from each other and assembled in a container filled with acid electrolyte. It is necessary to charge such a battery with an electric current before the battery can be employed as a source of electrical energy. During the charge, also referred to as formation, the lead oxide active material within the battery is converted into compounds of lead which store the input energy and which will redeliver this energy whenever the battery is discharged. At the positive plates the active material is converted to lead peroxide and that at the negative plates reduced to finely divided metallic lead or sponge lead. At this stage the storage battery is fully charged. It is customary to remove the electrolyte used for formation and replace it with a stronger acid electrolyte followed by a conditioning charge before putting the battery into service.

The term dry charged batteries in the lead storage battery art refers to batteries prepared according to conventional procedures described above plus additional processing as washing and drying the formed plates, assembling the dried plates with dry separators in battery containers and finally sealing the containers. Such batteries are placed in service by removing the seals and filling the cells with a solution of the acid electrolyte. The battery should be capable of delivering a substantial portion of its ampere-hour rating without any intermediate or booster charge.

Proper drying of the formed negative plates presents one of the more serious problems in the manufacture of dry charged storage batteries. The active material in the formed negative plates is finely divided, reduced, metallic lead. When this material is moist it tends to oxidize very rapidly in the presence of air. To the extent of such oxidation there will be a proportional loss of charge resulting in a product deficient as a source of energy until regenerated.

In the past it has been customary to effectuate the drying of charged negative plates in heated chambers or ovens containing an inert atmosphere. Steam, carbon dioxide and nitrogen gases were commonly employed for this purpose. While such procedures were effective, they required such an amount of operating and equipment costs that they proved to be uneconomical. The drying processes had a further disadvantage in that the operating conditions were critical. Even under the best conditions, overheating of the plates sometimes occurred causing warping, buckling or in extreme cases melting of the battery plates.

It has now been discovered that dry charged batteries can be manufactured without the employment of special drying equipment by employing novel active material compositions.

The principal object of this invention is to provide a novel active material composition for lead-acid storage batteries.

Another object is to provide a new process for the manufacture of dry charged storage batteries wherein the employment of special drying chambers, inert atmospheres and the like are obviated.

A still further object is to provide a means for retarding the oxidation tendency of charged negative plates during drying processes and in the presence of air.

These and other objects of this invention will become apparent from the following detailed description and example thereof.

Broadly the active material of this invention consists of lead oxide and intimately admixed therewith a minor proportion of an aryl substituted hydroxybenzoic acid. The arylhydroxybenzoic acid is represented by the formula

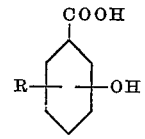

Wherein R represents an aryl or substituted aryl group. The preferred materials within the class of arylhydroxybenzoic acids are the phenylhydroxybenzoic acids. Examples of the phenylhydroxybenzoic acids include 3-phenyl-2-hydroxy benzoic acid, 4-phenyl-2-hydroxy benzoic acid, 5-phenyl-2-hydroxy benzoic acid, 2-phenyl-4-hydroxy benzoic acid and 2-phenyl-3-hydroxy benzoic acid. The arylhydroxybenzoic acids may be admixed with the lead oxide employed in any convenient manner so long as the resultant active material is reasonably homogeneous.

The amounts of arylhydroxybenzoic acid in active material for storage battery plates may be varied considerably. Generally amounts between about 0.1 and 5% by weight of the active material are sufficient. Amounts greater than 5% tend to dilute the lead oxide content of the active material with impairment of the ampere-hour output of the battery while amounts less than 0.1% are ineffective. Excessive amounts of arylhydroxybenzoic acid in the active material paste has the disadvantage of imparting undesirable properties to the paste and of materially lengthening the time required for electrolytically forming the battery plates.

The lead oxide employed may be entirely litharge or litharge containing a substantial proportion of finely divided metallic lead. Other oxides of lead as for example red lead, may be employed in place of litharge as will be understood by those skilled in the art.

According to the practice of this invention lead oxide and a small proportion of an arylhydroxybenzoic acid are mixed until well blended. This active material is made into a paste by the addition of dilute sulfuric acid. The amounts of sulfuric acid employed are such as to produce a plastic and adhesive paste which will readily adhere to a grid structure. The steps of assembling the positive and negative plate groups in a nested relationship, insulating them from each other by separators and electrochemically forming the plates in an electrolyte solution of sulfuric acid are similar to those followed in conventional methods for the manufacture of storage batteries. Thereafter, the negative plates are removed from the battery, the electrolyte drained off and the plates set up to dry in a draft of air. The negative plates need not be washed free of electrolyte, in fact it is preferable that they not be washed. A somewhat greater proportion of the charge is retained in the plates when they are not washed. This may be due to a physical removal of some of the additive during the washing procedure with a consequent lowering of the antioxidation effect on the sponge lead. Since washing is not advantageous, it has been found preferable to conduct formation of the plates in relatively weak electrolyte having a specific gravity at the start of about 1.010.

*Example*

Active material consisting of lead oxide containing 30% finely divided metallic lead and 3-phenyl-2-hydroxybenzoic acid amounting to 0.7% by weight of the active material was mixed with dilute sulfuric acid to make a paste. The paste was pressed into grids, and the resultant plates assembled in a battery and electrochemically formed in electrolyte of 1.010 specific gravity according to conventional procedures. After formation, the negative plates were removed, drained and then dried in a forced draft of air preheated to 190° F. These were then reassembled with the positive plates which had also been dried along with dry microporous rubber separators.

To better illustrate the specific embodiment of the invention in this example, a control battery containing no 3-phenyl-2-hydroxybenzoic acid in the negative plate active material was processed and tested along with the battery of the example. The retention of charge was measured by the following tests.

According to the first test, oxidation of the negative plates is indicated by a drop in the specific gravity of the electrolyte after the battery is filled. The test is based on the conversion reaction of lead oxide to lead sulfate in the presence of sulfuric acid. To the extent that oxidation occurred at the negative plates during drying to form lead oxide, the above reaction will take place with a proportionate drop in the specific gravity of the electrolyte.

The batteries were filled with electrolyte of 1.275 specific gravity and allowed to stand until the lowering of the specific gravity stopped and remained constant. The specific gravity of the electrolyte in the control battery dropped 42 points to 1.233. The electrolyte in the battery produced according to this invention dropped 7 points to 1.268.

Following the above test, the batteries were tested for capacity. Capacity was determined by the S. A. E. 20 hour discharge test wherein the capacity is expressed in ampere-hours. The initial capacity was taken without any intermediate charge. Thereafter, the battery was fully recharged and a second capacity rating determined. This second capacity rating is indicative of the normal capacity of the battery employed in the conventional way. The charge retentions below are expressed in percent based on the ratio of the initial capacity to the second or normal capacity.

The battery employing the active material of the instant invention retained 95.5% of its normal charge. The control battery retained 74% of the normal ampere-hour rating.

In the storage battery industry, it is customary for some oxide manufacturers to prepare lead oxide concentrates containing proportions of additives that are much higher than would ordinarily be employed in an active material paste. Such concentrates are particularly advantageous as an intermediate composition for sale to manufacturers of storage batteries who may make their own lead oxide. These battery manufacturers may blend the concentrate with lead oxide thereby arriving at the proper concentrations for active material paste. The provision of such concentrates is within the scope of this invention. According to this practical embodiment of the invention, lead oxide and an arylhydroxybenzoic acid may be mixed in any proportion to make a lead oxide concentrate. Concentrates will generally contain less than 50% arylhydroxybenzoic acid, preferable amounts being about 20% by weight of the concentrate.

The foregoing example and description illustrate the practice of this invention. Employment of the above described active material permits an entirely novel method for the manufacture of dry charged batteries. Whereas, heretofore, special drying chambers with inert atmospheres were required to dry formed negative plates, such plates may now be dried in air and without the employment of special equipment. It is to be understood that the active material may be modified with the addition of organic expander materials, blanc fixe and carbon black as will be understood by those skilled in the art.

The foregoing example and description is for the purpose of illustration only and no undue limitation should be deduced therefrom.

I claim:

1. Storage battery active material comprising lead oxide and an amount from 0.1 to 5% of an arylhydroxybenzoic acid, said amount of arylhydroxybenzoic acid being effective to retard oxidation of sponge lead formed by electrolytic reduction of said active material.

2. Storage battery active material comprising lead oxide and an amount from 0.1 to 5% of a phenylhydroxybenzoic acid, said amount of phenylhydroxybenzoic acid being effective to retard oxidation of formed negative plates.

3. Storage battery active material comprising lead oxide and about 0.1 to 5% by weight of said active material of 3-phenyl-2-hydroxybenzoic acid.

4. Storage battery active material comprising lead oxide and about 0.1 to 5% by weight of said active material of 5-phenyl-2-hydroxybenzoic acid.

5. Storage battery active material comprising lead oxide and about 0.1 to 5% by weight of said active material of 2-phenyl-4-hydroxybenzoic acid.

6. Storage battery active material comprising lead oxide and about 0.1 to 5% by weight of said active material of a phenylhydroxybenzoic acid.

7. A storage battery concentrate comprising lead oxide and at least 0.1% of an arylhydroxybenzoic acid.

8. A storage battery concentrate comprising lead oxide and at least 0.1% of a phenylhydroxybenzoic acid.

9. A storage battery concentrate comprising lead oxide and at least 0.1% of 3-phenyl-2-hydroxybenzoic acid.

10. A storage battery concentrate comprising lead oxide and 5-phenyl-2-hydroxybenzoic acid.

11. A lead oxide composition adapted for incorporation into a storage battery plate to serve as active material therein, comprising lead oxide and at least 0.1% of an arylhydroxybenzoic acid.

References Cited in the file of this patent

UNITED STATES PATENTS

| | | |
|---|---|---|
| 2,157,068 | Carruthers et al. | May 2, 1939 |

FOREIGN PATENTS

| | | |
|---|---|---|
| 4,843 | Great Britain | of 1912 |

OTHER REFERENCES

Trans. The Electrochemical Society, vol. 92, 1947, pages 229–257.